No. 835,857. PATENTED NOV. 13, 1906.
F. S. GOULDTHRITE.
DEVICE FOR RETAINING HEAT IN FOODS.
APPLICATION FILED JUNE 17, 1905.
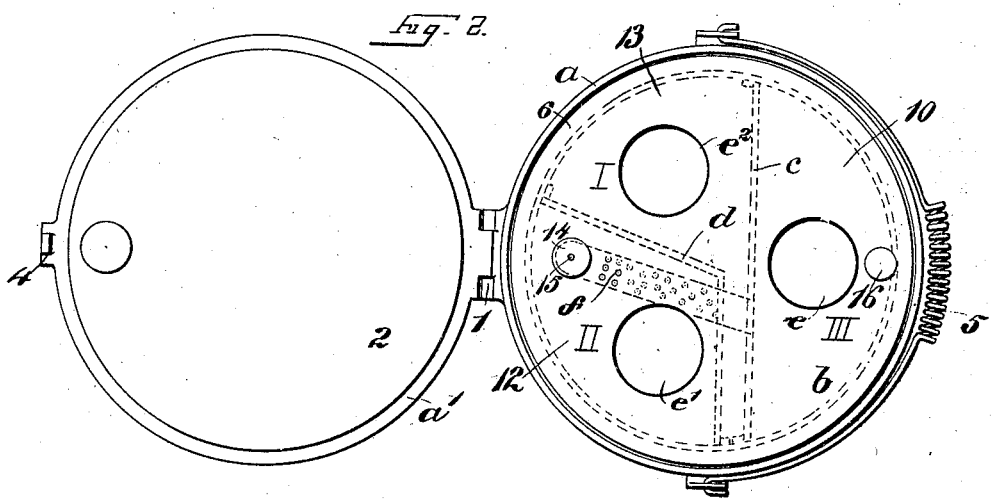
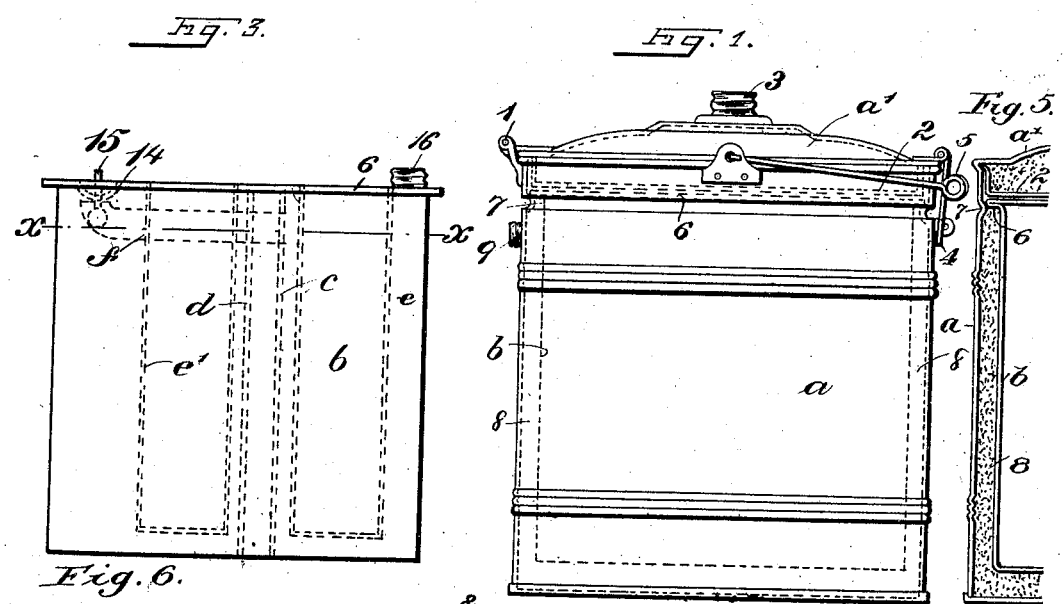
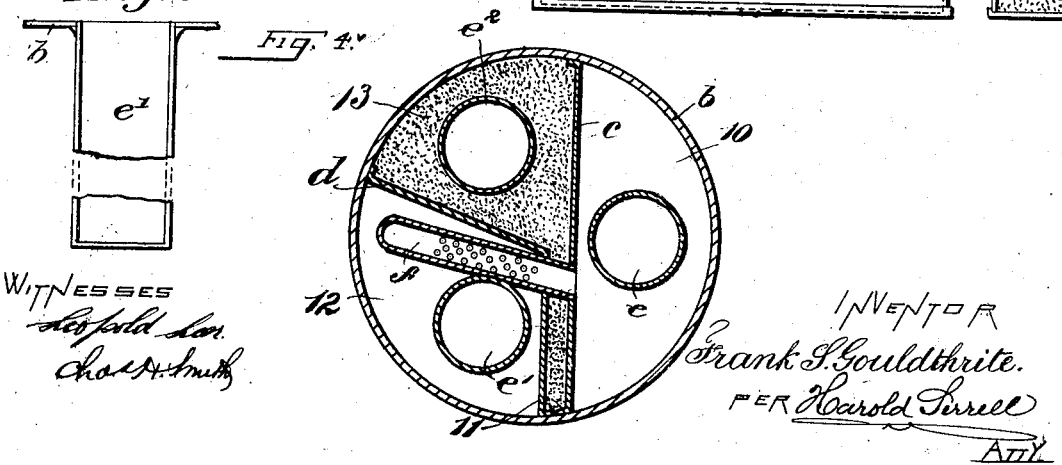

200~# UNITED STATES PATENT OFFICE.

FRANK S. GOULDTHRITE, OF OTTAWA, ONTARIO, CANADA, ASSIGNOR OF ONE-HALF TO WILLIAM MILLER JONES, OF WEST NEW BRIGHTON, NEW YORK.

DEVICE FOR RETAINING HEAT IN FOODS.

No. 835,857.   Specification of Letters Patent.   Patented Nov. 13, 1906.

Application filed June 17, 1905. Serial No. 265,693.

*To all whom it may concern:*

Be it known that I, FRANK S. GOULDTHRITE, a subject of the King of England, residing at Ottawa, in the Province of Ontario and Dominion of Canada, have invented an Improvement in Devices for Retaining Heat in Foods, of which the following is a specification.

Heretofore numerous vessels of various constructions have been designed to retain heat in foods; but so far as I am aware none of these have included means whereby the heat of the food contained in a number of receptacles placed in such vessels could be retained for varying lengths of time, depending upon when the food in a particular receptacle was to be required for use.

Now the object of my invention is the provision of a device for retaining heat in food which is particularly adapted for use in the feeding of infants at night and so constructed that the food being once heated and placed in bottles or other holders, which in turn are placed in the heat-retainer, the heat in the food in the respective bottles will be retained sufficiently long for the temperature of the food in the several bottles to be that desired for feeding from the respective bottles at the different predetermined times.

In carrying out my invention I employ an outer vessel, a spaced-apart inner vessel, vertical walls dividing the inner vessel into compartments, walls providing a receptacle in each compartment for bottles or other holders containing food the heat in which it is desired to retain, and means for permitting the flow of a heated liquid from one to another of the compartments, all of which will be hereinafter more particularly described.

In the drawings, Figure 1 is an elevation of my improved device for retaining heat in foods. Fig. 2 is a plan of the same, showing the cover thrown open. Fig. 3 is an elevation of the inner vessel. Fig. 4 is a section on line $x\ x$, Fig. 3. Fig. 5 is a cross-section through part of the vessel at one side and also through part of the cover, and Fig. 6 is a detached vertical section through the union of the top of the inner vessel with one of the receptacles.

$a$ designates an outer vessel, preferably made in the form of a pail or bucket and of tin or any other suitable material. The vessel $a$ is provided with a cover $a'$, hinged thereto at 1. Th cover $a'$ has a bottom 2, adapted to fit within the upper end of the outer vessel $a$. This cover structure forms a vessel in and of itself, and the same is preferably filled with sand or asbestos or some other equally good non-heat-conducting material admitted thereto through an opening in the top, normally closed by a cap 3. The cover $a'$ may be provided with a latch 4, by means of which the same may be secured in position in the upper end of the outer vessel $a$, and the vessel $a$ is advantageously provided with a handle 5.

$b$ designates an inner vessel, closed both top and bottom and adapted to fit within the outer vessel $a$, the top of the inner vessel $b$ having a flange 6, adapted to rest upon or be secured to an internal rib 7 in the shell of the outer vessel $a$. The respective inner and outer dimensions of the outer and inner vessels are such as to leave a space 8 between their sides and bottoms, which space I prefer to fill with sand or some non-heat-conducting material, which may be passed into said space through an opening in the wall of the outer vessel, normally covered by a cap 9.

The inner vessel $b$ is provided with a partition-wall $c$, extending from the top to the bottom thereof and providing a compartment 10 of about one-third the volume of the inner vessel. I also employ an angular partition-wall $d$, a portion 11 thereof running parallel with but spaced apart from the adjacent portion of the straight wall $c$. This angular wall $d$, together with the straight wall $c$, provide the compartments 12 and 13, a part of the latter extending between the portion 11 of the angular wall $d$ and the adjacent portions of the straight wall $c$.

Within each of the compartments 10, 12, and 13 I employ a series of receptacles $e$, $e'$, and $e^2$. Each of these receptacles is closed at the bottom and at the top is open and secured in the top of the inner vessel $b$ and is adapted to receive and contain a bottle, can, or other holder for containing food or other substances. $f$ designates a pipe or other connection leading from the upper portion of the compartment 10 through the portion 11 of the wall $d$ and terminating below a depression 14 in the top of the inner vessel b, and within the compartment 12 the pipe f is perforated.

Centrally the depression 14 is provided with an opening through which the stem 15 of a telltale passes, and the top of the inner vessel above the compartment 10 is provided with an opening normally closed by a cap 16, and the compartment 13, surrounding the receptacle $e^2$, is also preferably filled with sand or some other non-heat-conducting material.

In the use of the device hereinbefore described the cap 16 is first removed, and water or other heated liquid substantially boiling hot is poured into the compartment 10, first filling the same and then overflowing into the compartment 12 by way of the pipe f and the perforations therein until the latter compartment is filled, which of course will be indicated by the telltale. As the hot liquid overflows by the pipe f and fills the compartment 12 it will lose some of its heat in heating the walls of the compartment. This is more apparent because of being an overflow than will be the case of the liquid in the compartment 10. Furthermore, the material in the compartment 13 is heated by conduction and radiation of the hot liquid in the compartments 10 and 12, but only to an appreciable extent. It is therefore apparent that the contents of these compartments are at varying temperatures. The milk or other food is heated hot and put into the bottles or other holders, which are then placed in the receptacles e, e', and $e^2$. The heat is radiated and conducted from the food if the same is hotter than the contents of the compartments, or the food absorbs heat therefrom if cooler than said contents, and the ratio of cooling of the food is in proportion to its heat and the heat of the compartments 10, 12, and 13, it being apparent from the foregoing that food placed in the receptacle $e^2$ of the compartment 13 will cool quickest, that in the compartment 12 will cool slower, while that in the compartment 10 will retain its heat the longest. The ratio of the cooling of the contents of the compartments will in a measure be controlled by the size of the compartments and the area of their hot contents. The compartment 13 being the smallest will cool the quickest and the compartment 10 being the largest will cool the slowest. Furthermore, as the compartment 13 is filled with a material different from the material of the compartments 10 and 12 and its heat is not self-contained it will of course never be as hot as the compartments 10 and 12 and it will lose its heat quicker. I therefore prefer to number these receptacles "1," "2," and "3" in the order named to indicate the order in which the food placed therein is to be used, and it will also be apparent that the food for a night's feeding of an infant may be prepared at one time, and by employing my improved device the food will be ready for use at the proper temperature when required.

I claim as my invention—

1. In a device for retaining heat in foods, the combination with an outer vessel, of a spaced-apart inner vessel comprising sides, a bottom and top so connected as to form a tight liquid-holding receptacle, partition-walls dividing said inner vessel into internal compartments, a receptacle within each compartment open at its upper end and at this end let in through the top and secured thereto for receiving a vessel containing food to be kept heated and means permitting the compartments to be filled with heating medium.

2. In a device for retaining heat in foods, the combination with an outer vessel, of a spaced-apart inner vessel comprising sides, a bottom and top so connected as to form a tight liquid-holding receptacle, partition-walls dividing said inner vessel into internal compartments of varying areas, a receptacle within each compartment open at its upper end and at this end let in through the top and secured thereto for receiving a vessel containing food to be kept heated, a filling material in one of said compartments, a device forming a communicating means between other two of said compartments and means permitting the compartments to be filled with heating medium.

3. In a device for retaining heat in foods, the combination with an outer vessel, of a spaced-apart inner vessel comprising sides, a bottom and top so connected as to form a tight liquid-holding receptacle, a lining between said vessels, a straight vertical partition-wall within said inner vessel, a partition-wall at an angle to the aforesaid wall and said walls dividing said inner vessel into a plurality of compartments of varying sizes, a receptacle within each compartment open at its upper end and at this end let in through the top and secured thereto for receiving a vessel containing food to be kept heated and means permitting the compartments to be filled with heating medium.

4. In a device for retaining heat in foods, the combination with an outer vessel, of a spaced-apart inner vessel comprising sides, a bottom and top so connected as to form a tight liquid-holding receptacle, a lining between said vessels, a straight vertical partition-wall within said inner vessel, a partition-wall at an angle to the aforesaid wall and having a part parallel with a part thereof and spaced apart therefrom, a material filling the opening between said walls and also filling the compartment communicating therewith and said walls dividing said inner vessel into a plurality of compartments of varying sizes, a receptacle within each compartment open at its upper end and at this end let in through the top and secured thereto for receiving a vessel containing food to be kept heated and means permitting the compartments to be filled with heating medium.

5. In a device for retaining heat in foods, the combination with an outer vessel, of a spaced-apart inner vessel comprising sides, a bottom and top so connected as to form a tight liquid-holding receptacle, a lining between said vessels, a straight vertical partition-wall within said inner vessel, a partition-wall at an angle to the aforesaid wall and said walls dividing said inner vessel into a plurality of compartments of varying sizes, a receptacle within each compartment open at its upper end and at this end let in through the top and secured thereto for receiving a vessel containing food to be kept heated, a device forming a communicating means between two of said compartments and means permitting the compartments to be filled with heating medium.

6. In a device for retaining heat in foods, the combination with an outer vessel, of a spaced-apart inner vessel comprising sides, a bottom and top so connected as to form a tight liquid-holding receptacle, a lining between said vessels, a straight vertical partition-wall within said inner vessel, a partition-wall at an angle to the aforesaid wall and having a part parallel with a part thereof and spaced apart therefrom, a material filling the opening between the said walls and also filling the compartment communicating therewith and said walls dividing said inner vessel into a plurality of compartments of varying sizes, a receptacle within each compartment open at its upper end and at this end let in through the top and secured thereto for receiving a vessel containing food to be kept heated, a device forming a communicating means between other two of said compartments and means permitting the compartments to be filled with heating medium.

7. A device for retaining heat in foods, comprising an outer vessel, a spaced-apart inner vessel, a straight vertical partition-wall within said inner vessel, an angular vertical partition-wall also within said inner vessel and a portion of which is parallel with and spaced apart from said straight vertical wall, said walls dividing said inner vessel into three compartments of varying sizes, means for admitting a hot heating liquid to one of these compartments, a pipe connection leading from one of said compartments to another of said compartments, and a receptacle in each of said compartments adapted to receive a vessel containing food, the heat in which is to be retained for different lengths of time.

8. A device for retaining heat in foods, comprising an outer vessel, a spaced-apart removable inner vessel, a straight vertical partition-wall within said inner vessel, an angular vertical partition-wall also within said inner vessel and a portion of which is parallel with and spaced apart from said straight vertical wall, said walls dividing said inner vessel into three compartments of varying sizes, means for admitting hot heating liquid to one of these compartments, a pipe connection leading from said compartment to another of said compartments, a receptacle in each of said compartments adapted to receive a vessel containing food, the heat in which is to be retained for different lengths of time, and a filling of non-heat-conducting material surrounding the receptacle in the third of said compartments.

9. A device for retaining heat in foods, comprising an outer vessel, a spaced-apart inner vessel, a straight vertical partition-wall within said inner vessel, an angular vertical partition-wall also within said inner vessel, said walls dividing said inner vessel into a plurality of compartments of varying sizes, a receptacle for each of said compartments for receiving a vessel containing food, the heat in which is to be retained for different lengths of time, means for admitting a heating liquid to one of said compartments, and a device providing communication between said compartment and an adjacent compartment as an overflow therefor.

10. A device for retaining heat in foods, comprising an outer vessel, a spaced-apart inner vessel, a straight vertical partition-wall within said inner vessel, an angular vertical partition-wall also within said inner vessel and a portion of which is parallel with and spaced apart from said straight wall, said walls dividing said inner vessel into a plurality of compartments of varying sizes, a receptacle in each of said compartments adapted to receive a vessel containing food the heat in which is to be retained for different lengths of time, means for admitting a heating liquid to one of said compartments, and a device providing communication between said compartment and an adjacent compartment as an overflow therefor.

Signed by me this 26th day of May, 1905.

FRANK S. GOULDTHRITE.

Witnesses:
DOUGLAS H. McDONALD,
AGNES H. BURKE.